(12) United States Patent
Soatti

(10) Patent No.: US 6,932,178 B2
(45) Date of Patent: Aug. 23, 2005

(54) REAR AXLE FOR MOTORCYCLES HAVING A TRANSMISSION CARDAN SHAFT

(75) Inventor: Piero Soatti, Bologna (IT)

(73) Assignee: Moto Guzzi Spa, Lecco (IT)

( * ) Notice: Subject to any disclaimer, the term of this patent is extended or adjusted under 35 U.S.C. 154(b) by 0 days.

(21) Appl. No.: 10/467,283

(22) PCT Filed: May 3, 2002

(86) PCT No.: PCT/IT02/00292

§ 371 (c)(1),
(2), (4) Date: Aug. 6, 2003

(87) PCT Pub. No.: WO03/093096

PCT Pub. Date: Nov. 13, 2003

(65) Prior Publication Data

US 2004/0140141 A1 Jul. 22, 2004

(51) Int. Cl.⁷ .............................................. B62M 17/00
(52) U.S. Cl. ...................................................... 180/226
(58) Field of Search ................................ 180/226, 227, 180/219

(56) References Cited

U.S. PATENT DOCUMENTS

| | | | | |
|---|---|---|---|---|
| 2,077,628 A | * | 4/1937 | Jordan ........................ | 180/226 |
| 4,327,930 A | * | 5/1982 | Tominaga et al. .......... | 280/284 |
| 4,336,859 A | | 6/1982 | Leitner | |
| 4,434,868 A | | 3/1984 | Brenner et al. | |
| 4,662,469 A | * | 5/1987 | Matsuda et al. ............ | 180/219 |
| 4,951,791 A | * | 8/1990 | Belil Creixelli ............ | 180/219 |
| 5,067,580 A | | 11/1991 | Parker | |
| 5,263,549 A | * | 11/1993 | Dick .......................... | 180/226 |

FOREIGN PATENT DOCUMENTS

DE          1 055 981          4/1959

* cited by examiner

*Primary Examiner*—Tony Winner
(74) *Attorney, Agent, or Firm*—Fredrikson & Byron, P.A.

(57) ABSTRACT

A rear axle for motorcycles comprises a torque or link bar and a fork that is elastically suspended to the frame and encloses a Cardan drive shaft in a first parallel arm thereof which is joined to a housing for the bevel gear pair driving the rear wheel. At both end portions of the torque bar there are provided a second pivot for connection to the frame above a first pivot of the fork, and a third pivot for connection to a floating member, respectively, in which the floating member is in turn supported within the housing for the bevel gear pair by a fourth pivot firmly joined to the hub of the wheel. The axis (F) of the third pivot is parallel to the axis of rotation (R) of the rear wheel.

7 Claims, 3 Drawing Sheets

REAR AXLE FOR MOTORCYCLES HAVING A TRANSMISSION CARDAN SHAFT

This application claims priority to and is the national phase under 35 U.S.C. § 371 of PCT International Application No. PCT/IT02/00292 which has an International filing date of May 3, 2002, which designated the United States of America.

BACKGROUND OF THE INVENTION

The present invention refers to a rear axle for motorcycles of the type employing a Cardan shaft for transmitting motive power from the motor to the rear driving wheel.

Although far less popular than chain drive systems, Cardan-shaft drives for transmitting motive power in motorcycles are a subject covered by a number of patent publications, most of which provide however for the use of two swing arms connecting the rear wheel to the frame of the motorcycle, albeit with a single damping unit—see for instance DE-A-698 258, CH-A-318 696 and DE-A-1 055 981.

A number of further examples of rear axles for motorcycles are known in the art, in which a Cardan drive shaft is coupled to a single swing arm, although the state of art that is considered as being the most relevant one to the purposes of the present invention is represented by the two patent publications that are more closely examined below.

In both such patents, the housing accommodating the bevel gears used to transmit motion to the driving wheel is not rigidly linked to the swing arm, but is rather hinged thereto in such a manner as to be floating. Furthermore, it is guided by means of a torque bar connected to the frame, with the result that the moment generated by the contact forces of the rear wheel contacting the ground is partially opposed, i.e. compensated for by said torque bar. This again results in both a smaller extension of the suspension when the motorcycle is accelerating and a smaller compression of the same suspension when the motorcycle is braking, i.e. slowing down. Accordingly, the motorcycle is enabled to behave in a more agreeable manner.

In particular, the patent publication U.S. Pat. No. 4,434,868 discloses a rear axle which is formed by a four-bar linkage, the main component parts of which are the swinging suspension arm, which encloses the Cardan drive shaft with its two universal joints, and the torque or link arm, which bears the whole weight of the motorcycle since the end portions thereof are hinged on to the frame and to a downwards extending appendix of the housing accommodating the bevel gears, respectively. The main drawback connected with such a kind of construction lies in the fact that, in the case of said torque arm and/or the pin connecting the latter to said housing breaking down (an event that is really not so unlikely to occur considering the vicinity of these parts to the ground), the motorcycle becomes unusable since it is no longer capable of sustaining itself or even collapses.

In U.S. Pat. No. 5,067,580, the swing arm of the rear axle carries the lower end portion of a damper and connects the frame with a pivot whose axis does not coincide with the axis of rotation of the rear wheel; in turn, the torque or link arm is arranged above the swing arm and extends parallel thereto, as well as co-planar with the Cardan drive shaft. Such a construction, apart from being inherently expensive owing to the relatively large number of component parts involved, is exposed to obvious risks deriving from the fact that the drive shaft in its entirety, i.e. including its two universal joints, is unguarded and consequently is exposed to bumps against obstacles that may be encountered during running. Moreover the possibility exists for the lower hem of garments (trousers or skirts) worn by the persons using the motorcycle to be caught in the drive shaft.

SUMMARY OF THE INVENTION

It therefore would be desirable, and is actually a main purpose of the present invention to provide a motorcycle having all of the afore cited advantages of rear wheels or rear axles featuring a Cardan drive shaft, a single suspension arm and a torque or link arm, but without the above mentioned technical drawbacks.

A further purpose of the present invention is to provide a rear axle that is capable of being manufactured on an industrial scale at reasonably low costs.

According to the present invention, these and further aims are reached in a rear axle having the features as recited in the appended claims.

BRIEF DESCRIPTION OF THE DRAWINGS

Features and advantages of the present invention will be more readily understood from the description of an embodiment of the present invention that is given below by way of non-limiting example with reference to the accompanying drawings, in which.

DETAILED DESCRIPTION

Figure 1:
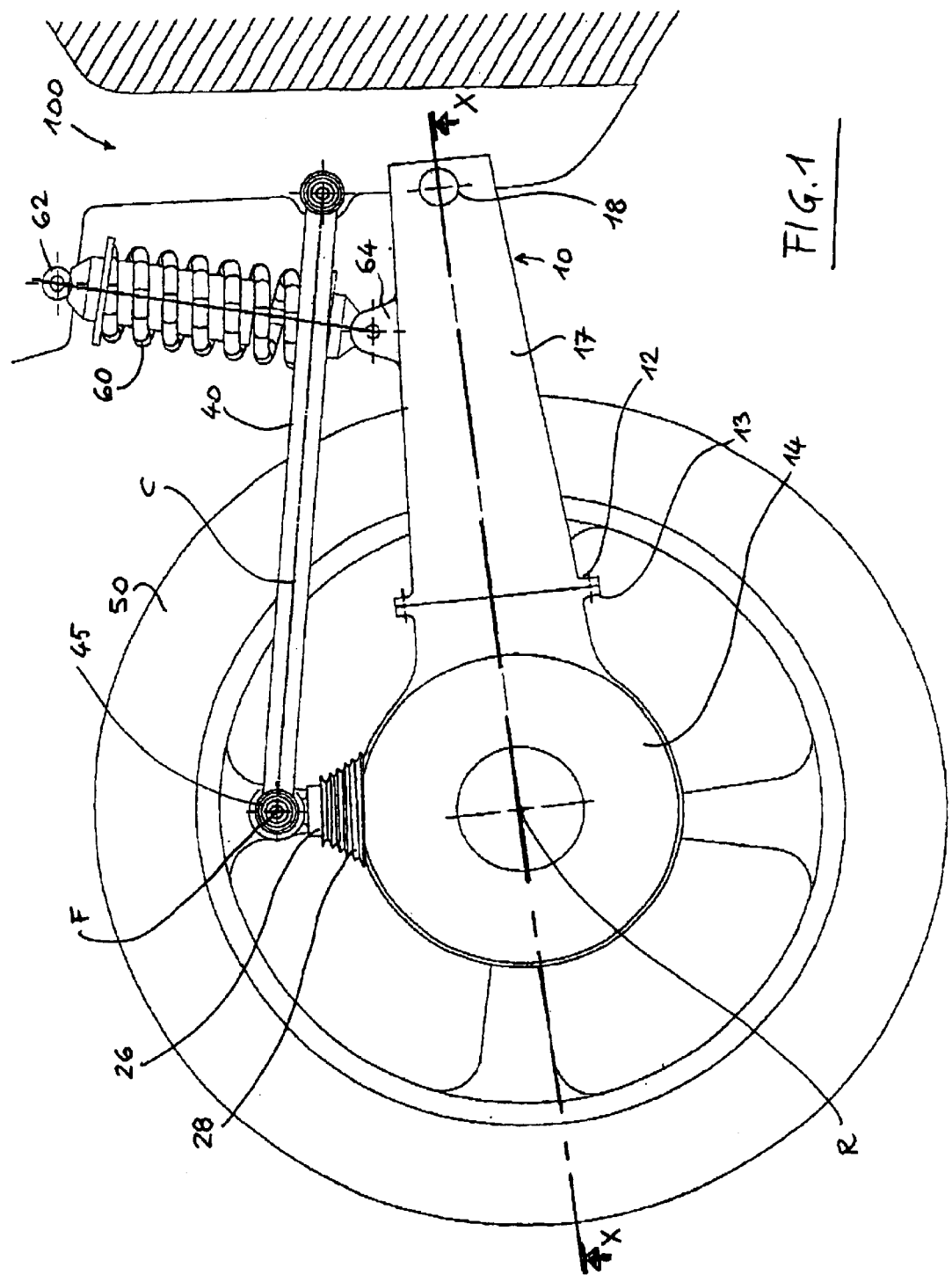
FIG. 1 is a side view of a rear axle of a motorcycle, in which the, frame parts associated to said rear axle are illustrated schematically.
Figure 2:
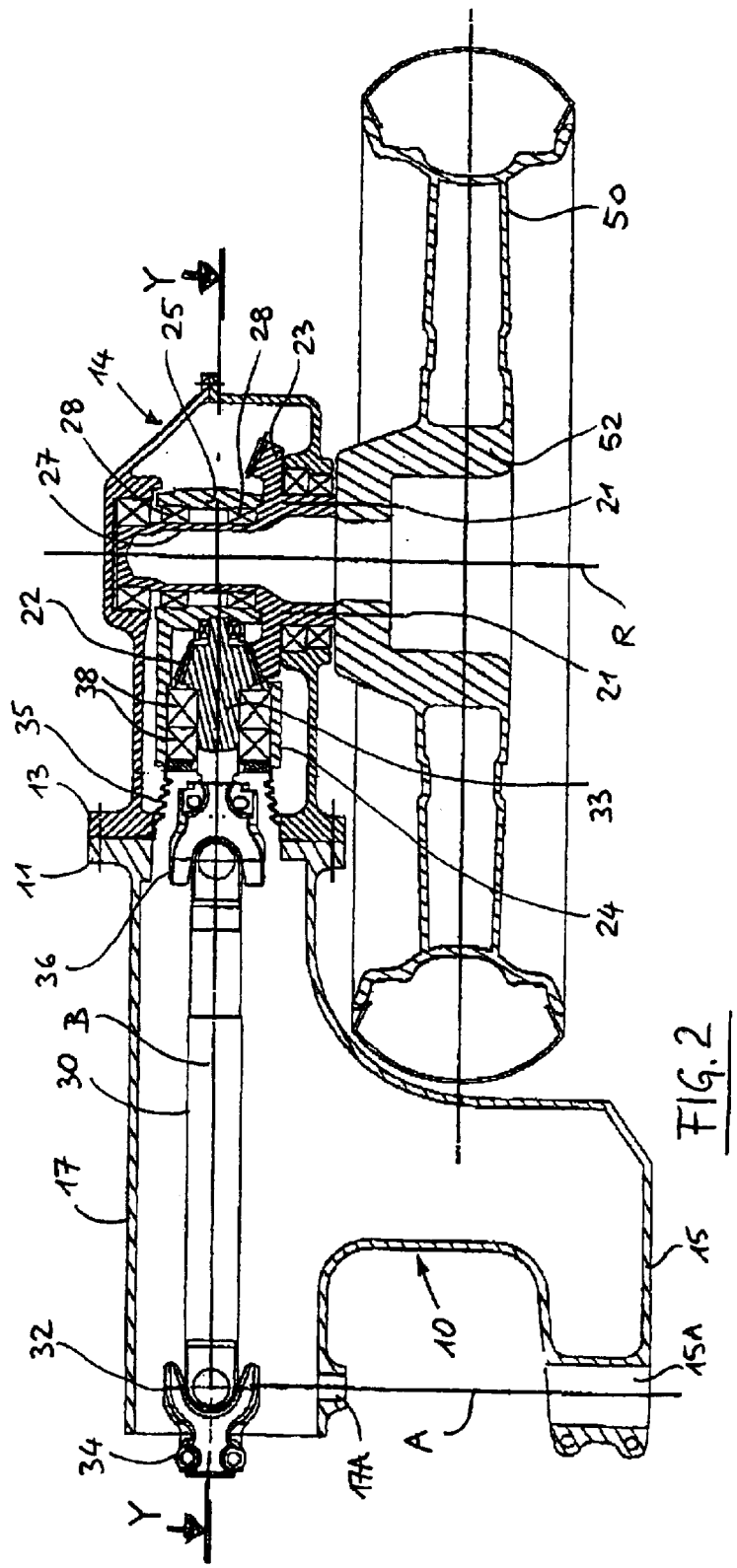
FIG. 2 is a cross-sectional view of the sole rear axle according to the horizontal line X—X of FIG. 1.
Figure 3:
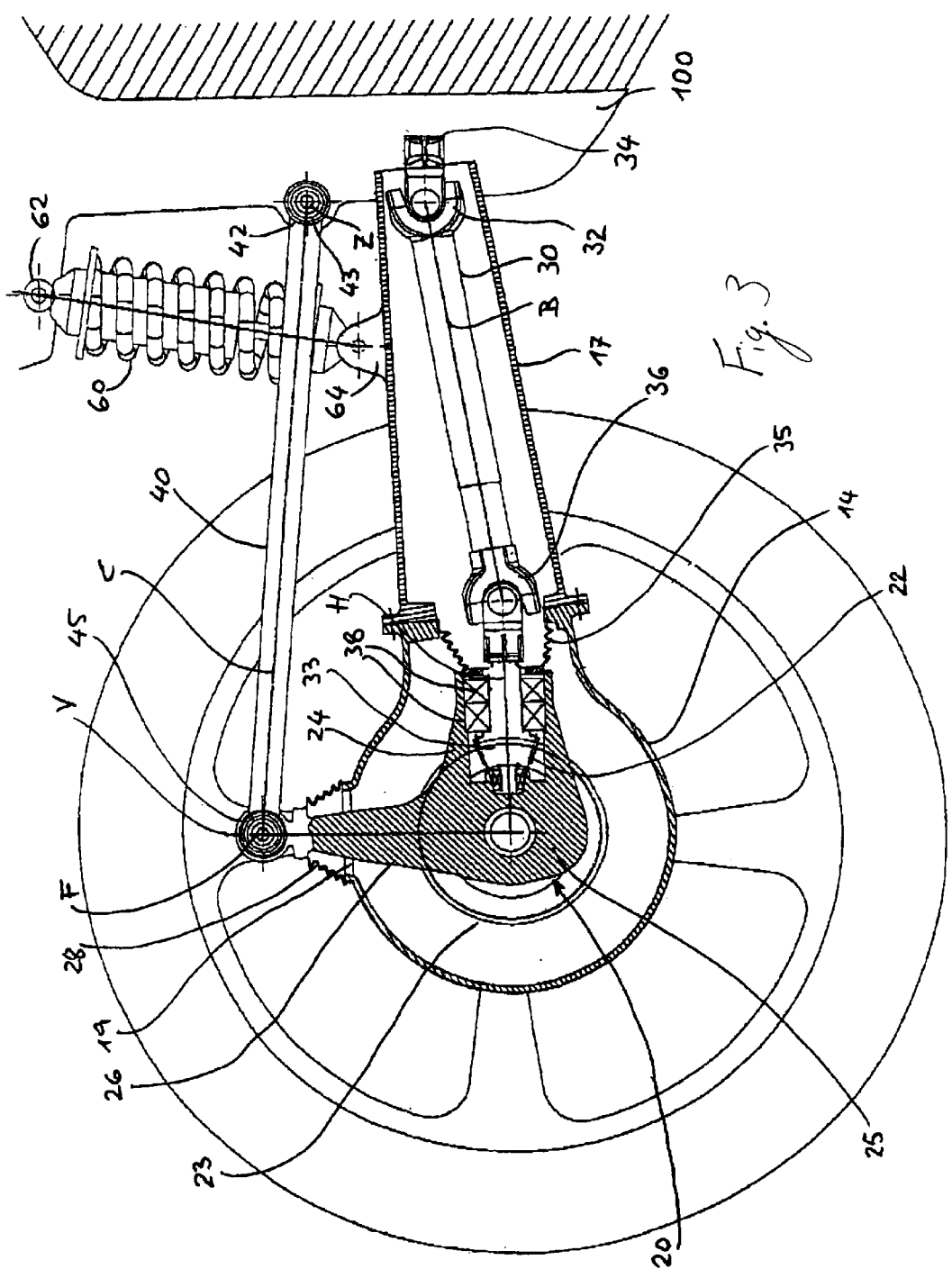
FIG. 3 is a cross-sectional view along the line Y—Y of FIG. 2, in which the frame parts associated to the rear axle are again illustrated schematically.

In the herein illustrated preferred embodiment, the main component parts of the rear axle, that is the members connecting the hub 52 of the rear wheel 50 of a motorcycle with the frame 100 of the same motorcycle (said frame, owing to reasons of greater simplicity, being illustrated only schematically in the Figures, as duly pointed out above) are:

a hollow fork 10 with two parallel arms, a second parallel arm 15 and a first parallel arm 17, joined to a housing 14, which consists of a pair of mating shells, by means of a set of screws (not shown for greater simplicity) in correspondence of the respective flanged portions 11 and 13. The fork 10 and the housing 14 may be manufactured of any material and with any industrial technique or process that would ensure the required level of mechanical strength at an acceptably low cost. In this connection, they may for instance be made of a cast aluminium alloy. At the free ends of the two parallel arms 15 and 17 there are provided the supports 15A and 17A intended to receive a first pivot 18 with the help of which the fork 10 is, in a traditional manner, suspended to the frame 100 along an axis indicated at A in FIGS. 1 and 2 in such a manner as to be able to swing on a vertical plane that perpendicular to the axis of rotation R of the wheel 50;

a floating member 20, which constitutes the basic feature of the present invention and which, owing to the important role it performs from both a structural and a functional point of view, is manufactured of a high-strength material, such as preferably an aluminium alloy which would offer the additional advantage of a low weight. When looked at from a side, as it is actually shown in FIG. 3, the floating member 20 is in the shape of a "L" with a central zone 25 from which there can be seen a first arm 24 and a second arm 26 do extend along the axes H and V, respectively, which are both perpendicular to the axis of rotation R of the wheel 50—see FIG. 3. Said central zone 25 of the floating member 20 is supported, with the aid of bearings 28, by a fourth pivot 27, which is attached to the hub 52 of the rear wheel 50 by means of screws (of which only the axes are shown in FIG. 2 as indicated generally at 21), and which is in turn supported through bearings 29 by the housing 14. Accordingly, the floating member 20 is enclosed within the afore mentioned housing 14, except solely for the free end of the second arm 26, which in fact comes out therefrom through a slit 19 provided on top of the housing 14;

a torque bar 40, the rectilinear axis of which is indicated at C in FIG. 3, and which extends above the fork 10 and is quite obviously made of a high-strength material as well. The proximal end portion 42 of the bar 40 is attached to the frame 100 by means of a second pivot 43, the axis Z of which is parallel to the axis A of the first pivot 18 by means of which the fork 10 is suspended to the frame, whereas the distal end portion 44, the axis F of which is parallel to the axis of rotation R of the rear wheel 50, is attached by means of a third pivot 45 to said free end of the second arm 26 of the floating member 20;

a spring damping unit 60 connecting a point 62 of the frame 100 situated above the pivots 43 and 45 located at the end portions of the torque bar 40, with an eyelet 64 on the upper side of and outside the first parallel arm 17 of the fork 10—see FIGS. 1 and 3.

The longer arm 17 of the fork 10 encloses the Cardan drive shaft 30 that extends along an axis indicated at B between a first universal joint 32 for connection with the output shaft 34 of the engine (not shown, but largely known to be supported by the frame 100) and a second universal joint 36, which will be explained in greater detail further on, and which is arranged more or less in correspondence of the flanges 11 and 13—see FIG. 2. The axis B of the Cardan drive shaft 30 and the axis C of the torque bar 40 define a vertical plane running perpendicular to the axis of rotation R of the rear wheel 50. In turn, the shorter arm 15 of the fork 10 is situated on the opposite side of the rear wheel 50.

In turn, the housing 14 accommodates a pair of bevel gears, The first gear is a pinion 22 shrink-fitted on a hub 33 attached to said first universal joint 32 and sustained by the first arm 24 of said floating member 20 through the bearings 38. The second gear is a ring gear 23 shrink-fitted on the afore mentioned fourth pivot 27 attached to the hub 52 of the rear wheel 50—see FIGS. 2 and 3. Within said housing 14, said bevel gears are submerged in a bath of lubricating oil delimited by a second bellows-like gasket 35, which is retained between the flanges 11, 13 of the fork 10 and the first arm 24 of the floating member 20, and by a first bellows-like gasket 28 that is retained between the free end portion of the second arm 26 of the floating member 20 and the rim of the aperture 19 provided on top of the housing 14—see FIG. 3.

Owing to the particular construction described above, it therefore is the floating member 20 that ensures the connection between the drive shaft 30 and the torque bar 40. In this way, the rear axle according to the present invention allows not only for the traditional swings of the fork 10 about the axis A of the first pivot 18 by means of which it is suspended to the frame 100, and therefore of the rear wheel 50 on a vertical plane perpendicular to the axis of rotation R of the same wheel, but also for the swings of the hub 33 of the pinion 22 about the same axis of rotation R, within the limits allowed for by the clearance between the width of the slit 19 on top of the housing 14 and the free end portion of the second arm 26 of the floating member 20.

This is a particularly advantageous feature of the present invention, which cannot be traced or found in the state of the art, actually.

Further advantages offered by the present invention derive from the fact that, even in the case of the torque bar 40 and/or the pivots 43, 45 provided at the end portions thereof being damaged or breaking down, the motorcycle does not collapse thanks exactly to the function performed by the floating member 20 as a connection means linking the drive shaft 30 and the torque bar 40.

It will be appreciated that, although the above description refers to a preferred embodiment of the present invention, a number of different variants and embodiments may be developed without departing from the scope of the present invention as defined by the appended claims.

In particular, it shall be appreciated that the torque bar might even be given a different arrangement relative to the tubular body and the drive shaft accommodated therein, and that different means and methods may be also used to elastically suspend the fork to the frame of the motorcycle.

What is claimed is:

1. Rear axle for a motorcycle comprising a frame supporting an engine and a rear driving wheel comprising a hub, the axle being provided with a Cardan drive shaft with a first universal joint for connection with the engine and a second universal joint for connection with a hub of a pinion that is part of a pair of bevel gears along with a ring gear that is firmly joined to the rear driving wheel, in which said rear axle comprises:
   a tubular body that is attached to the frame by means of a first pivot and accommodates said Cardan drive shaft and said universal joints,
   a housing, which is joined to said tubular body and accommodates said pair of bevel gears,
   elastic damping means for suspending said tubular body to the frame,
   a non-deformable torque bar, which extends between a second and a third pivots, wherein said second pivot has its axis (Z) parallel to the axis (A) of the first pivot and is located in a higher position than said first pivot, and said third pivot is provided at end portions of said torque bar, has its axis (F) parallel to the axis of rotation (R) of the rear wheel and connects the torque bar with a floating member that is supported within said housing by a forth pivot which is firmly joined to the hub of the wheel and which in turn supports said hub of the pinion.

2. Rear axle for a motorcycle provided with a Cardan drive shaft according to claim 1, characterized in that said torque bar extends above said tubular body and, therefore, above said Cardan drive shaft.

3. Rear axle for a motorcycle provided with a Cardan drive shaft according to claim 1 or 2, characterized in that the elastic damping means for the suspension of said tubular body to the frame are fixed to the frame at a point situated above the second and third pivots provided at the end portions of said torque bar.

4. Rear axle for a motorcycle provided with a Cardan drive shaft according to claim 1, characterized in that said tubular body is in the shape of a fork with two parallel arms, a first parallel arm of which encloses the said Cardan shaft and has a flanged end portion for connection to a corresponding flange of said housing for the bevel gears, whereas a second parallel arm is situated on an opposite side of the rear wheel.

5. Rear axle for a motorcycle provided with a Cardan drive shaft according to claim 1, characterized in that said floating member comprises:
- a central zone that is the portion thereof which is supported by said fourth pivot firmly joined to the hub of the wheel;
- a first arm, which extends from said central zone along an axis (H) that is perpendicular to the axis of rotation (R) of the rear wheel, and which is the portion that supports said hub of the pinion through associated bearings;
- a second arm, which extends from said central zone along another axis (V) that is perpendicular to both the axis of rotation (R) of the wheel and the axis (H) of the said first arm, has a free end portion protruding through and from an aperture in said housing and also is the portion that links said floating member with said third pivot of the torque bar.

6. Rear axle for a motorcycle provided with a Cardan drive shaft according to claim 5, characterized in that between the free end portion of said second arm of said floating member and said aperture of the housing there is retained a first bellows gasket adapted to prevent lubricating oil from leaking from the housing.

7. Rear axle for a motorcycle provided with a Cardan drive shaft according to claim 5 or 6, characterized in that a second bellows gasket, performing the same function as said first bellows like gasket, is retained between the parts with which said tubular body is joined to said housing and said first arm of the floating member, respectively.

* * * * *